United States Patent [19]

Cheyne

[11] Patent Number: 4,841,207

[45] Date of Patent: Jun. 20, 1989

[54] PULSE WIDTH MODULATED CONTROL METHOD AND MEANS

[75] Inventor: Neil G. Cheyne, St. Helens, New Zealand

[73] Assignee: Fisher & Paykel, Auckland, New Zealand

[21] Appl. No.: 88,657

[22] Filed: Aug. 24, 1987

Related U.S. Application Data

[63] Continuation of Ser. No. 709,043, Mar. 7, 1985, abandoned.

[30] Foreign Application Priority Data

Mar. 8, 1984 [NZ] New Zealand ............... 207431
Mar. 8, 1984 [NZ] New Zealand ............... 207430

[51] Int. Cl.$^4$ ............................................. H02P 5/16
[52] U.S. Cl. ................................. 388/811; 318/139; 318/599; 388/903
[58] Field of Search ............... 318/311, 312, 313, 314, 318/315, 316, 317, 318, 322, 326, 327, 328, 332, 341, 345, 599, 601, 602, 600, 603, 604, 605, 606, 607, 608, 609, 615, 616, 617, 618, 619, 628, 139, 282, 283, 292, 293, 295, 376; 363/41, 56

[56] References Cited

U.S. PATENT DOCUMENTS

| | | | |
|---|---|---|---|
| 3,914,671 | 10/1975 | Morton et al. ................. | 318/139 |
| 4,037,145 | 7/1977 | Bailey et al. . | |
| 4,169,990 | 10/1979 | Lerdman . | |
| 4,215,383 | 7/1980 | Boyd et al. . | |
| 4,291,259 | 9/1981 | Marumoto et al. ........... | 318/139 |
| 4,328,447 | 5/1982 | Davis et al. . | |
| 4,355,342 | 10/1982 | Franzolini ..................... | 361/91 |
| 4,390,826 | 6/1983 | Erdman et al. . | |
| 4,401,926 | 8/1983 | Morton et al. ................ | 318/376 |
| 4,468,597 | 8/1984 | Baumard et al. ............. | 318/317 |

OTHER PUBLICATIONS

Brochure entitled Switched Mode Power Supply Controller No. NE/SE 5561 by Signetics dated May, 1981 (cover page and pp. 1-6).

Primary Examiner—William M. Shoop, Jr.
Assistant Examiner—Paul Ip
Attorney, Agent, or Firm—Christie, Parker & Hale

[57] ABSTRACT

The method uses at least one power switch having "on" and "off" states for providing, respectively, low and high impedance paths between an inductive load and a source of power and thereby controls current flow through the inductive load during a sequence of regular reoccurring time periods. The at least one power switch is switched, if in the "off" state, to the "on" state substantially at the beginning of at least some of the time periods. The method is operative during any one of a plurality of the "on" duty periods and switches the at least one power switch from the "on" state to the "off" state when a predetermined level of current flow has been reached in one of the inductive load and the at least on power switch, and switches the at least one power switch back to the "on" state independent of the occurrence of the beginning of a time period.

31 Claims, 17 Drawing Sheets

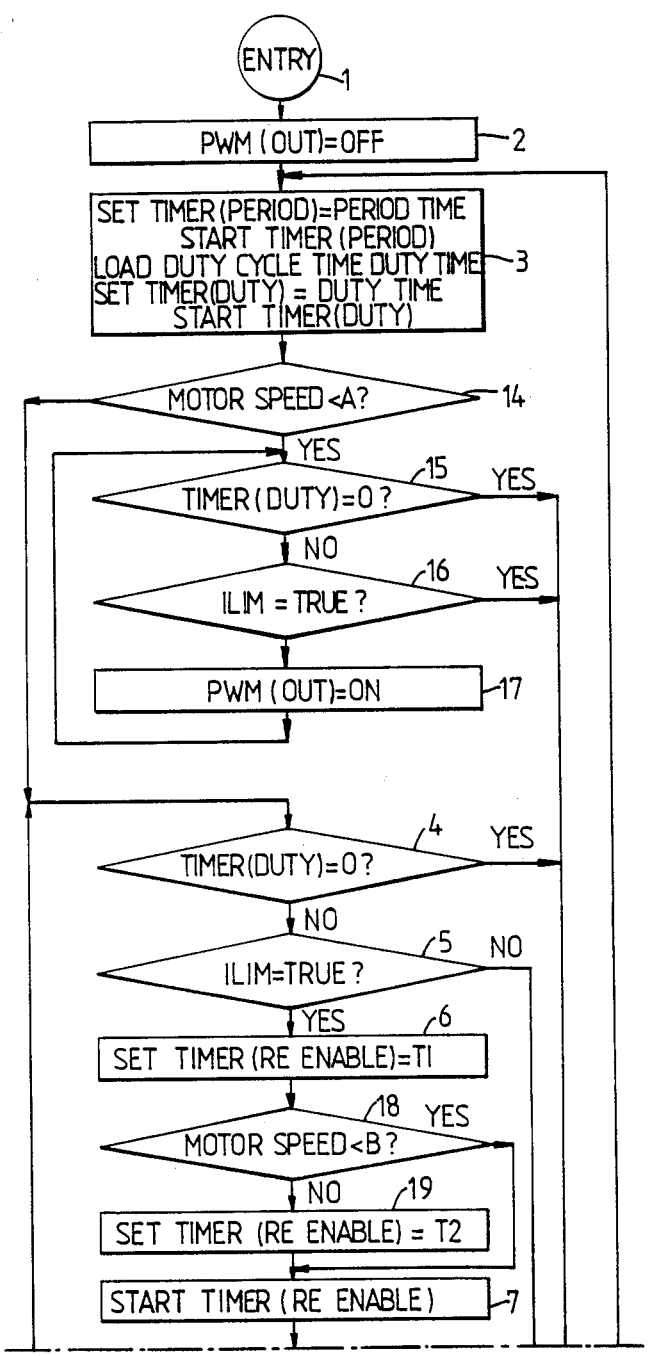

PWM CONTROL

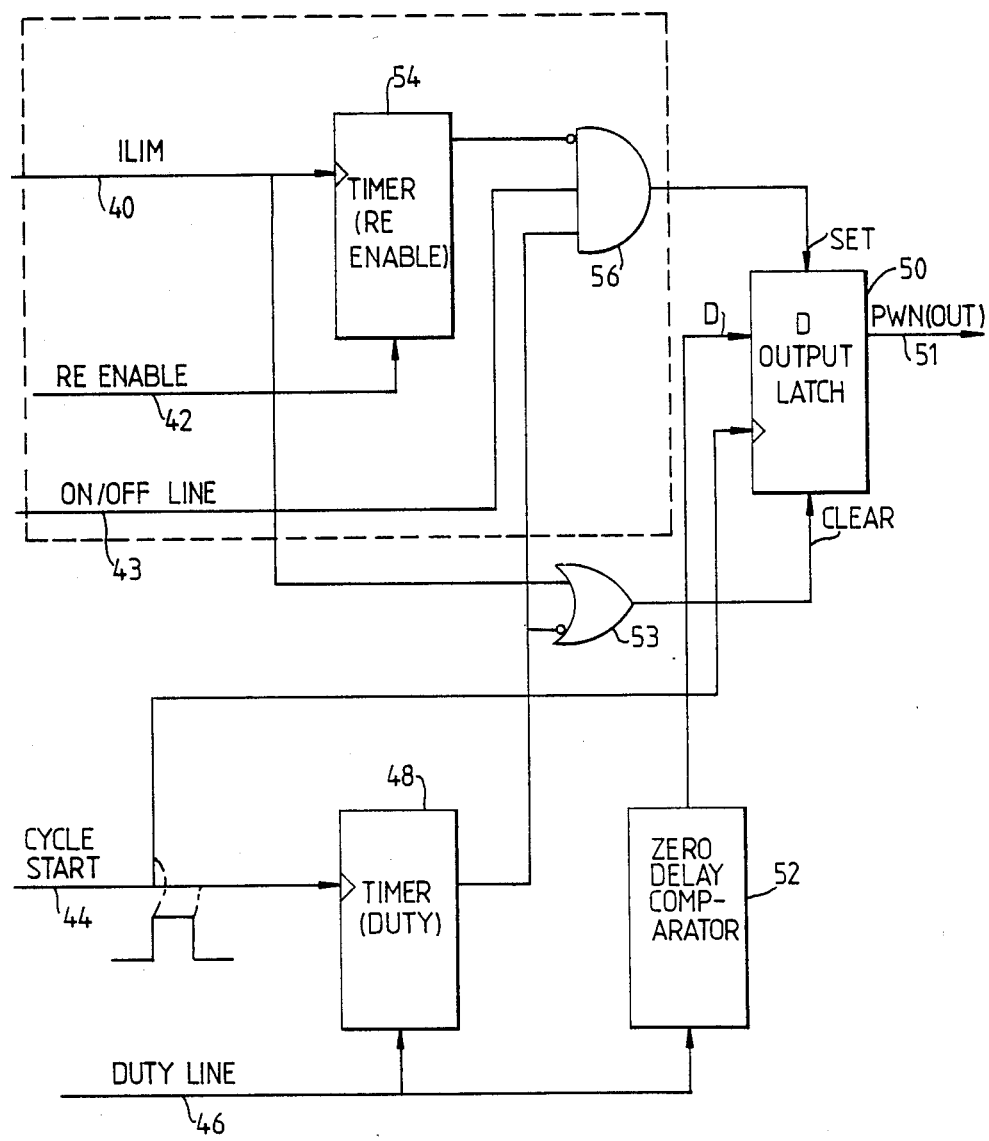

PWM CONTROL

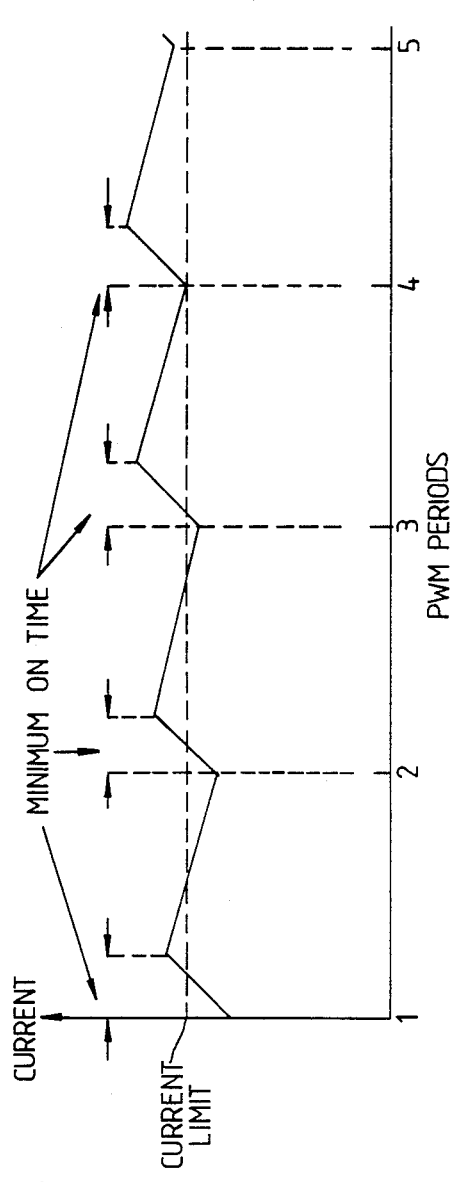
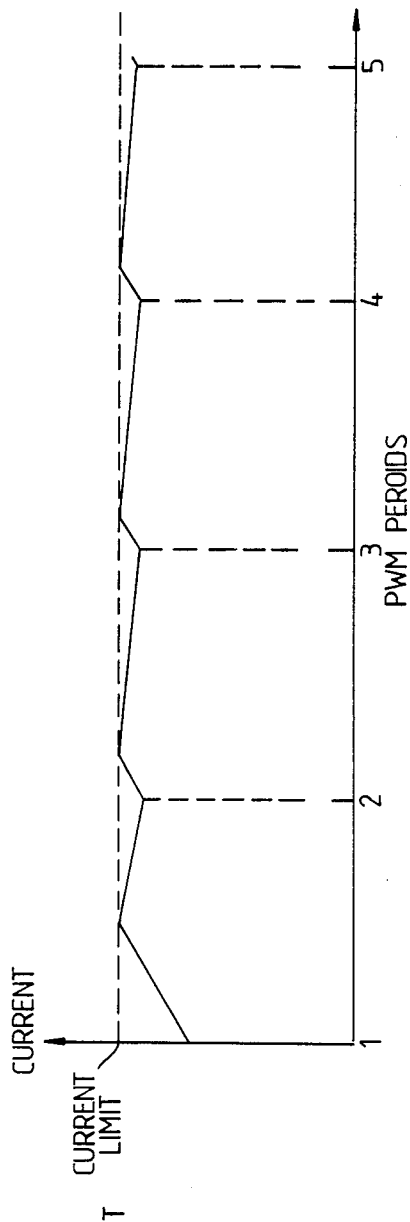
Fig.12 PRIOR ART
Fig.13 PRIOR ART

PULSE WIDTH MODULATED CONTROL METHOD AND MEANS

CROSS REFERENCE TO RELATED APPLICATIONS

Portions of the disclosure herein are related to a copending patent application entitled TOTEM POLE SNUBBER METHOD AND MEANS, filed in the name of the same inventor and on the same date as this application, the entire content of which is incorporated by reference herein.

BACKGROUND OF THE INVENTION

This invention relates to improved electronic pulse width modulated control method and means for supplying power to an inductive load with special applications to D.C. motors.

Methods are known for controlling current in an inductive load using a relatively high frequency chopper circuit in the order of 10 KHz for applying power to the load using pulse width modulation (P.W.M.).

P.W.M. controls typically operate in relation to reoccuring P.W.M. periods. A clock or other sequencer typically times the beginning of each P.W.M. period. A power switch (or switches) is typically switched "on" (if not already "on"), applying a pulse of current to the load at the beginning of each P.W.M. period. In the "off" state the power switch removes the power applied to the load. A P.W.M. controller, which may include the power switches, controls the "on" and "off" times of the power switches.

On a pulse-by-pulse basis, each pulse of applied power can be limited in duration by duty cycle control or by current limit control when a predetermined maximum current is flowing either in the load and/or in the power switch which couples the power to the load.

FIG. 10 is a flow chart depicting the "on" and "off" time of the power switch for a known P.W.M. method for driving an inductive load and could be implemented on either a software or firmware controlled computer or in hardware or a combination of the two. The "on" and "off" states of the power switch connect and disconnect a source of power across the inductive load.

One of the significant inductive loads controlled by P.W.M. techniques is that of a motor winding for a D.C. motor.

The flow chart of FIG. 10 contains eight blocks numbered 1-8. The operation within blocks 2, 3, 6 and 8 depicts action items whereas the items in blocks 4, 5 and 7 depict test conditions and branches to be taken depending on the results of the tests. The symbolic notation used within the blocks will become better understood with reference to the description of FIGS. 3-5.

However, the operation can briefly be described as follows. As depicted by FIG. 11, the P.W.M. control is controlled by regular reoccurring clock periods or P.W.M. periods. P.W.M. periods 1, 2, 3 and 4 are shown by way of example. At the beginning of each P.W.M. period, the P.W.M. control forms an "on" or high signal which turns "on" the power switch coupling the source of power across the inductive load. A duty cycle is selected for the "on" period depicted as "ton". When the duty period has elapsed, the P.W.M. control turns the power switch "off", allowing the power to remain "off" for the rest of the P.W.M. period.

The P.W.M. control also monitors the current flowing, either in the inductive load or through the power switch, and when the current reaches a predetermined limit value, the P.W.M. control switches the power switch "off". This occurs during P.W.M. period 3 at 3a.

When the inductive load is a winding or windings of a D.C. motor, there are many constraints that have to be taken into account when selecting a P.W.M. switching frequency. Some of the pertinent constraints are now described.

Switching Losses:

Any power switch used in a chopper circuit has internal switching losses and there may be switching losses in associated circuitry such as a snubber or diode protection device for the power switch. These losses are undesirable from thermal considerations, and are directly proportional to the switching frequency. Therefore, to keep switching losses low it is desirable to keep the switching frequency low.

Avoidance of Current Ramping:

The following two equations govern the rate of rise of current in the motor windings for the "on" and "off" states of the power switch:

$$\text{"on" state: } di/dt = \frac{V_s - (E + IR)}{L} \quad (1)$$

$$\text{"off" state: } di/dt = -\frac{(E + IR)}{L} \quad (2)$$

where:
 $V_s$ = D.C. supply voltage
 E = Motor back E.M.F.
 I = Current flowing in the motor windings
 R = Resistance of motor windings
 L = Inductance of motor windings
 di/dt = Rate of rise of current In typical power switching applications, current limiting is used to protect the power switches against current rising above the maximum limit allowable for the power switch. Sensing circuitry is used to monitor current in the motor windings and/or the power switch. By sensing the current the power switches can be turned "off" before the current reaches this maximum limit. In practice, a predetermined current limit is set that is known to be inside the switching capabilities of the power switch.

Typically, in D.C. motor applications, a power switch has one side coupled through the motor windings to one rail of a D.C. supply voltage and the other side of the power switch is coupled serially through a sensing resistor to the return of the supply voltage. Also, a free wheel diode may be connected in parallel with the motor windings to allow current decay in the winding when the power switch is "off".

When the power switch is "on," current flows from the supply voltage through the motor windings, the power switch, the current sensing resistor and back through the return. When the power switch is switched "off," however, the current decays through the motor windings and around through the free wheel diode. During the power switch "off" state, current cannot be sensed in the sense resistor. Therefore, even when the maximum allowable level of current is flowing in the motor windings, if the power switch is "off", the current is not sensed. At the start of the next P.W.M. period the power switch is turned "on" if the duty cycle is not zero. Also, depending on the type of power switch, there are constraints which cause a minimum "on" time of the device once it has been switched "on". Such a constraint may be the inherent storage time of a bipolar power transistor.

The implication of this minimum "on" time is that even if a current limit is reached as soon as the power switch is turned "on", the power switch cannot turn "off" until this minimum time has elapsed. Once it has turned "off", current is removed from the sense resistor, and at the start of the next P.W.M. period, this minimum "on" time cycle can be repeated.

For a D.C. motor, when the back E.M.F. (E) is small and the expression E+IR is small with respect to the supply voltage Vs, then, from equations (1) and (2) the rate of rise of current is high relative to its rate of fall.

To ensure current stays at or below the maximum level when current limit control is occurring, it is important that the current falls during the power switch "off" time by at least as much as it rises during the "on" time. If this condition is not met, it can result in failure of the power switch by excessive current build-up occurring over several P.W.M. periods. This mechanism is known as current ramping and is illustrated in the current waveform of FIG. 12.

To control current ramping, it is necessary to have an "off" time of sufficient duration to allow the current to fall by at least as much as it can rise during minimum "on" time. In practice, this requirement then limits the maximum switching frequency or puts constraints on the type of switching device which is suitable.

Another method of controlling current ramping is to continuously sense the current flowing in the motor windings. Thus the current limit sensing can remain active even during the "off" time and be used to prevent the new P.W.M. period from turning "on" the power switch if a current limit is still present. In practice, however, the difficulty and/or cost of continuous current sensing, particularly for multi-phase motor systems, can make this approach restrictive in its application.

CURRENT RIPPLE

It is a property of a D.C. motor that the torque produced from the motor is directly proportional to the current flowing in the motor windings. When maximum torque is required from the motor, the P.W.M. control system allows maximum current to flow and operates in a current limited mode. A current limited mode is one in which 100% duty cycle is provided and, as a result, the power switch stays "on" continuously through a P.W.M. period and even into the next P.W.M. period and only turns "off" when a current limit is sensed.

When the motor speed is low and the back E.M.F. is low, then the rate of fall of current during the "off" time is low with respect to the rate of rise of current during the "on" time as outlined above when discussing current ramping. Since the rate of fall of current is low within a single P.W.M. period, then, provided current ramping can be avoided, low current ripple, particularly in current limit operation, is obtainable in the motor windings. FIG. 13 depicts the low ripple current waveform for low back E.M.F.

When the motor speed is high, motor back E.M.F. is high, and the situation is reversed. With the back E.M.F. high, then from equations (1) and (2) it can be seen that the rate of fall of current during the "off" time is high with respect to the rate of rise of current during the "on" time. Therefore, if a current limit occurs at the start of a P.W.M. period, terminating the "on" time of the power switch, current will fall in the motor winding until the next P.W.M. period is commenced. If the P.W.M. period is long compared to the rate of fall of current, then during the "off" time the current could fall to a low or even zero value. If the current has fallen to zero in the motor windings, then it will stay at zero until the start of the next P.W.M. period occurs, and it may take several P.W.M. periods for current to build back up to the required level. This implies that 100% current ripple is possible. If the system is operating in the current limited mode, then this current ripple lowers the average current in the motor which in turn lowers the average torque developed by the motor. FIG. 14 shows the current waveform in the motor with high back E.M.F. and high current ripple compared with the previous FIG. 13.

The net effect of increasing current ripple with increasing motor speed is that the average driving current decreases and therefore the maximum available motor torque decreases with increasing motor speed. FIG. 15 illustrates this effect. Thus when the available motor torque has dropped and intersected the load torque line, the motor is incapable of any further increase in speed.

The problem of loss of average motor current at high speed is further aggravated in applications where a D.C. motor is driven from an A.C. rectified unfiltered supply, sometimes called a rippling rail supply. FIG. 16 depicts a voltage supply with full voltage ripple at twice the A.C. supply frequency. A motor running from this supply can draw current only when the magnitude of the supply voltage is greater than the motor back E.M.F. voltage. Thus the value of motor back E.M.F. determines the conduction angle and hence conduction time of current from the supply. With a high back E.M.F., the conduction angle is very low and the average torque in the motor over several main cycles is reduced accordingly.

One method to reduce current ripple and increase average driving current, with high speed and high load requirements, is to increase the switching frequency. This has the effect of reducing the maximum possible "off" time after a current limit before a new P.W.M. period begins, resulting in the effect shown in FIG. 17.

To summarize, a low switching frequency is required to minimize switching losses and to avoid current ramping, while a high switching frequency is required to minimize high speed and high load current ripple. The conflict is obvious.

For systems where this conflict must be accepted, the solution for increased motor torque at high speed is often to increase the switching frequency to the limit of current ramping and/or increase the peak allowable current in the power switch before current limiting occurs. Both of these methods increase the power handling requirements of the system and increase the cost.

Attempts have been made at minimizing the conflict. An example is disclosed in U.S. Pat. No. 4,037,145 entitled Multiple Frequency Chopper Control. In this patent, the switching frequency of the P.W.M. system is increased as the current in the motor increases. While this may decrease the effect of high speed current ripple, it does not take into account applications where there can be current ramping at low speed and the system must be rated to dissipate the switching losses when operating at the highest switching frequency.

BRIEF SUMMARY OF THE INVENTION

It is therefore desirable to have a P.W.M. control method and means that eliminate the switching frequency conflict without the need of increased power handling.

The present invention improves the operation of a P.W.M. control system. This is effected in an embodiment of the invention by using a single frequency P.W.M. period with a frequency of operation that maintains acceptable switching losses and effects of current ramping. Also, current ripple is reduced in loads where the current ripple can reach an undesirable level.

Briefly, a method which embodies the present invention uses at least one power switch having "on" and "off" states for providing, respectively, low and high impedance paths between an inductive load and a source of power, and thereby controls current flow through the inductive load during a sequence of regular reoccurring time periods. The at least one power switch is switched, if in the "off" state, to the "on" state substantially at the beginning of at least some of the time periods. The method comprises a combination of steps, operative during any one of a plurality of the "on" duty periods. The method switches the at least one power switch from the "on" state to the "off" state when a predetermined level of current flow has been reached in one of, the inductive load and the at least one power switch, and switches the at least one power switch back to the "on" state independent of the occurrence of the beginning of a time period.

BRIEF DESCRIPTION OF THE DRAWINGS

FIGS. 6A and 6B are block diagrams of a P.W.M. control for use in the P.W.M. controls of FIGS. 1 and 2 and embodying the method depicted in FIG. 5;

FIG. 12 is a waveshape diagram illustrating the current waveform under current ramping conditions for conventional P.W.M. controls known in the prior art;

FIG. 13 is a waveshape diagram illustrating the current waveform in the winding of a D.C. motor for conventional P.W.M. controls known in the art under low speed conditions;

DESCRIPTION OF PREFERRED EMBODIMENT

An embodiment of the invention involves method and means which operate such that within the "on" duty period of each P.W.M. period, the power switch is reenabled or turned back "on", independent of the beginning of a P.W.M. period, after having been switched "off" due to a current limit having been reached. Preferably the reenabling or turning back "on" of the power switch is delayed for a predetermined delay period after the power switch has been switched "off". Another embodiment of the invention switches the power switch back "on" after an "off" state after current in the inductive load has decayed to a predetermined current level.

Figure 1:
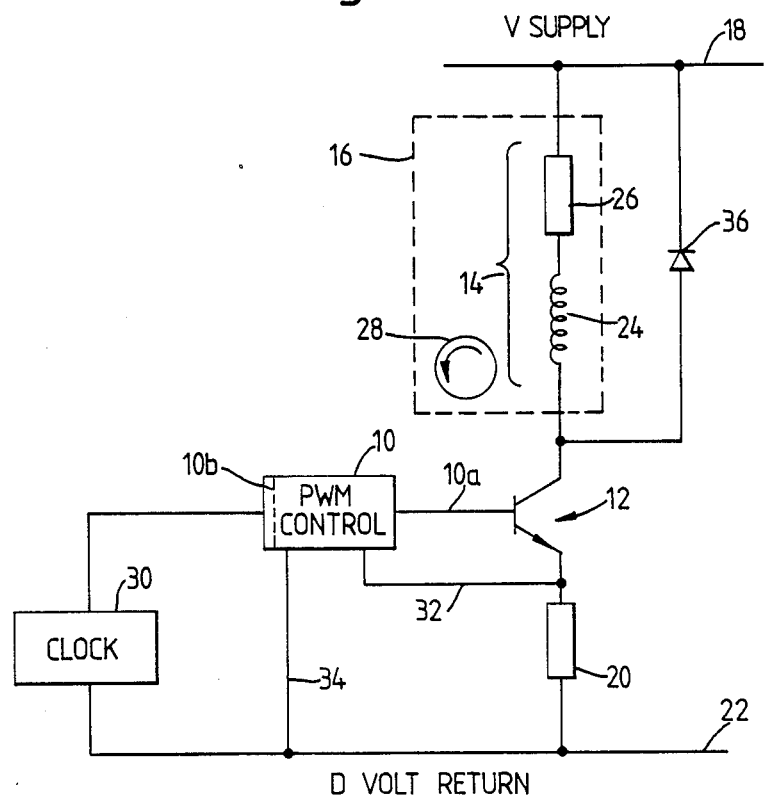
FIG. 1 is a schematic and block diagram of a P.W.M. control for controlling a power switch which provides low and high impedance paths between an inductive load and a source of voltage and embodying the present invention.

FIG. 1 is a schematic and block diagram depicting an embodiment of the present invention. FIG. 1 includes a P.W.M. control 10 whose output 10a is connected to a power switch in the form of a transistor 12. The transistor 12 has its collector electrode serially coupled through a motor winding 14 of a motor 16 to the positive side or rail 18 of a voltage supply called V supply. The emitter electrode of transistor 12 is serially connected through a current sensing resistor 20 to a return rail 22 where the return rail is connected to the negative, or 0 volt, side of V supply. The motor winding 14 is schematically depicted by an inductive element 24 and a resistive element 26 and a rotating armature 28. The motor 16 can be any one of a number of different types of D.C. motors, such as a D.C. brushless motor or an electronically commutated A.D. synchronous motor, which rotate the rotor responsive to current pulses in the winding. The P.W.M. control 10 has conductors 32 and 34 connected across the current sense resistor 20, and includes a circuit (not shown) which senses when a predetermined level or limit of current flow exists through resistor 20 and hence through transistor 12 and motor winding 14 during a "on" state of transistor 12.

P.W.M. control 10 applies a control signal to the base electrode of the transistor 12 to switch it to "on" and "off" states. When transistor 12 is "on", it is in a low impedance condition and couples the V supply across the motor winding 14, causing current flow through the motor winding 14, power switch 12 and the sense resistor 20 between the rails 18 and 22. When transistor 12 is "off" it forms a high impedance condition and in effect disconnects the source of power from the motor winding. When the P.W.M. control 10 switches the transistor 12 "off", the motor winding maintains its current flow in the same direction. However with the transistor 12 "off", current now circulates around the path including the motor winding and the free wheel diode 36. A clock 30 provides a source of regular reoccurring clock signals which synchonize the operation of the P.W.M. control 10.

The P.W.M. control 10 includes a microprocessor indicated generally at 10b. The microprocessor controls the sequence of operation of the transistor 12 thereby implementing the method and means according to the present invention.

Figure 4:
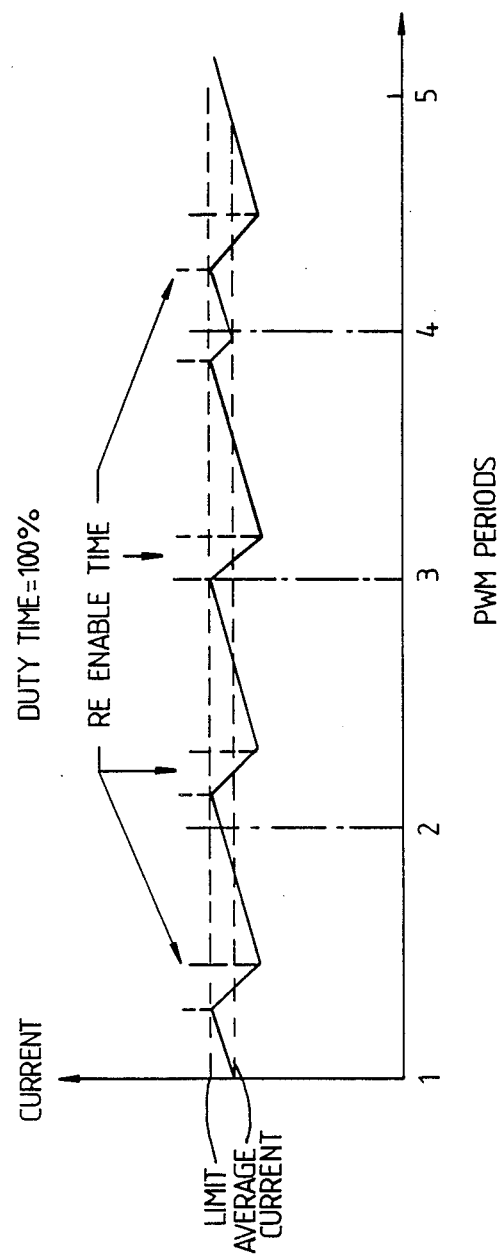
FIG. 4 is a waveshape diagram illustrating the current waveform in the motor windings of FIGS. 1 and 2 with the method of operation depicted in FIG. 3 at 100% duty cycle.
Figure 14:
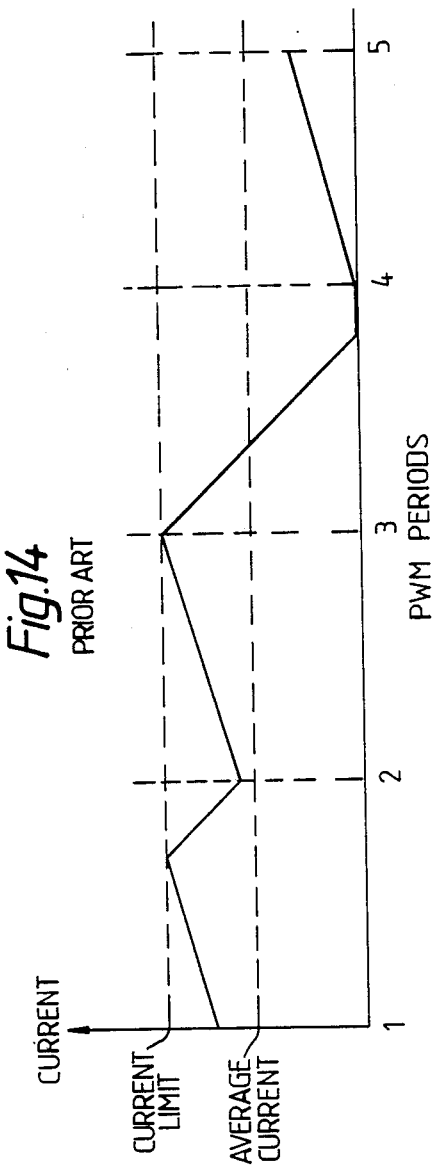
FIG. 14 is a waveshape diagram illustrating the current waveform in the winding of a D.C. motor employing a conventional P.W.M. control known in the prior art.
Figure 15:
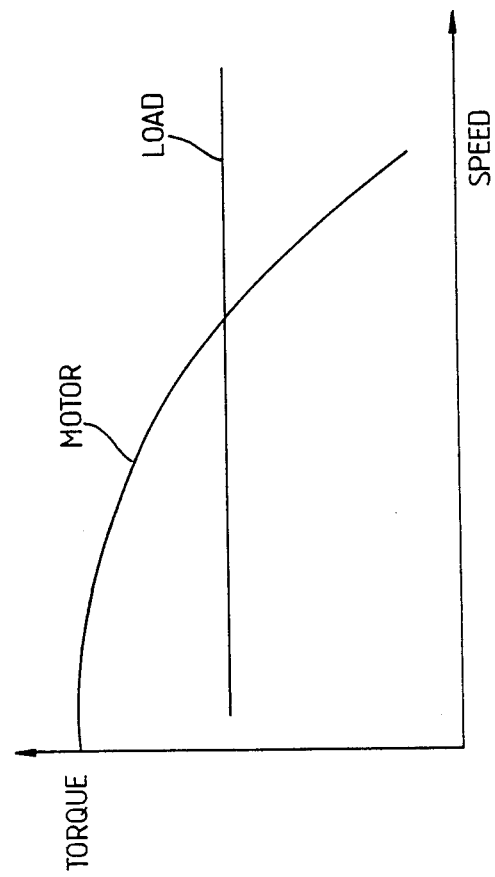
FIG. 15 depicts a waveshape diagram illustrating the torque curve of a motor employing a conventional P.W.M. control known in the prior art.
Figure 16:
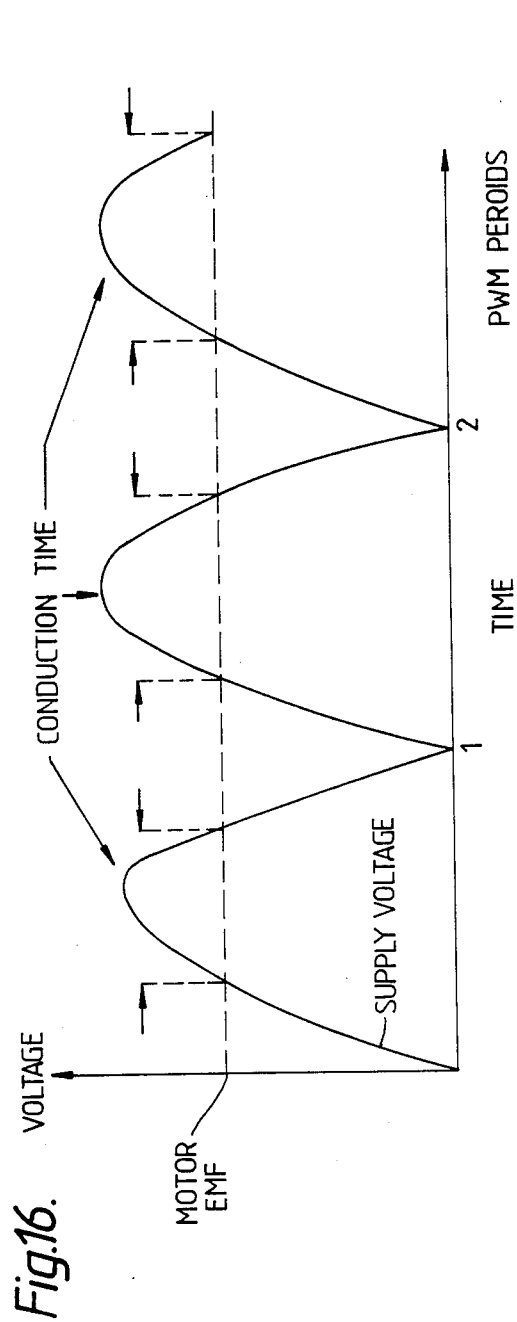
FIG. 16 depicts a waveshape diagram for rippling rail power supply and the corresponding conduction time of the power switch in a system of the type depicted in FIGS. 1 and 2.
Figure 17:
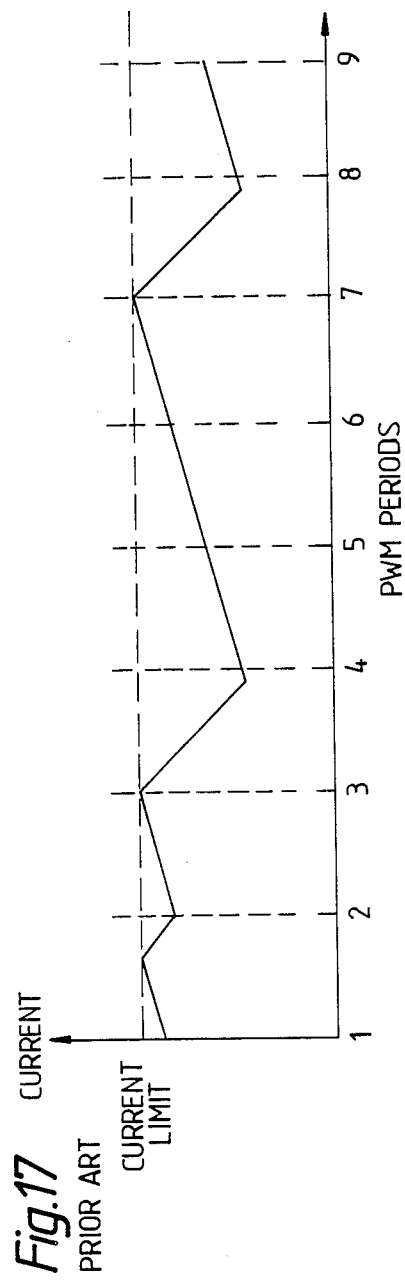
FIG. 17 depicts the current waveform in the motor windings of a D.C. motor control using a conventional P.W.M. control of the prior art.

FIG. 4 depicts the current waveform and operation of transistor 12 when the motor rotor is at high speed, and under high load similar to that depicted for the prior art in FIG. 14. It will be seen that the current ripple is substantially less than that of FIG. 14 and hence the average current driving the motor is substantially higher. This represents substantially higher available torque and higher efficiency and an improvement in performance.

Figure 3:
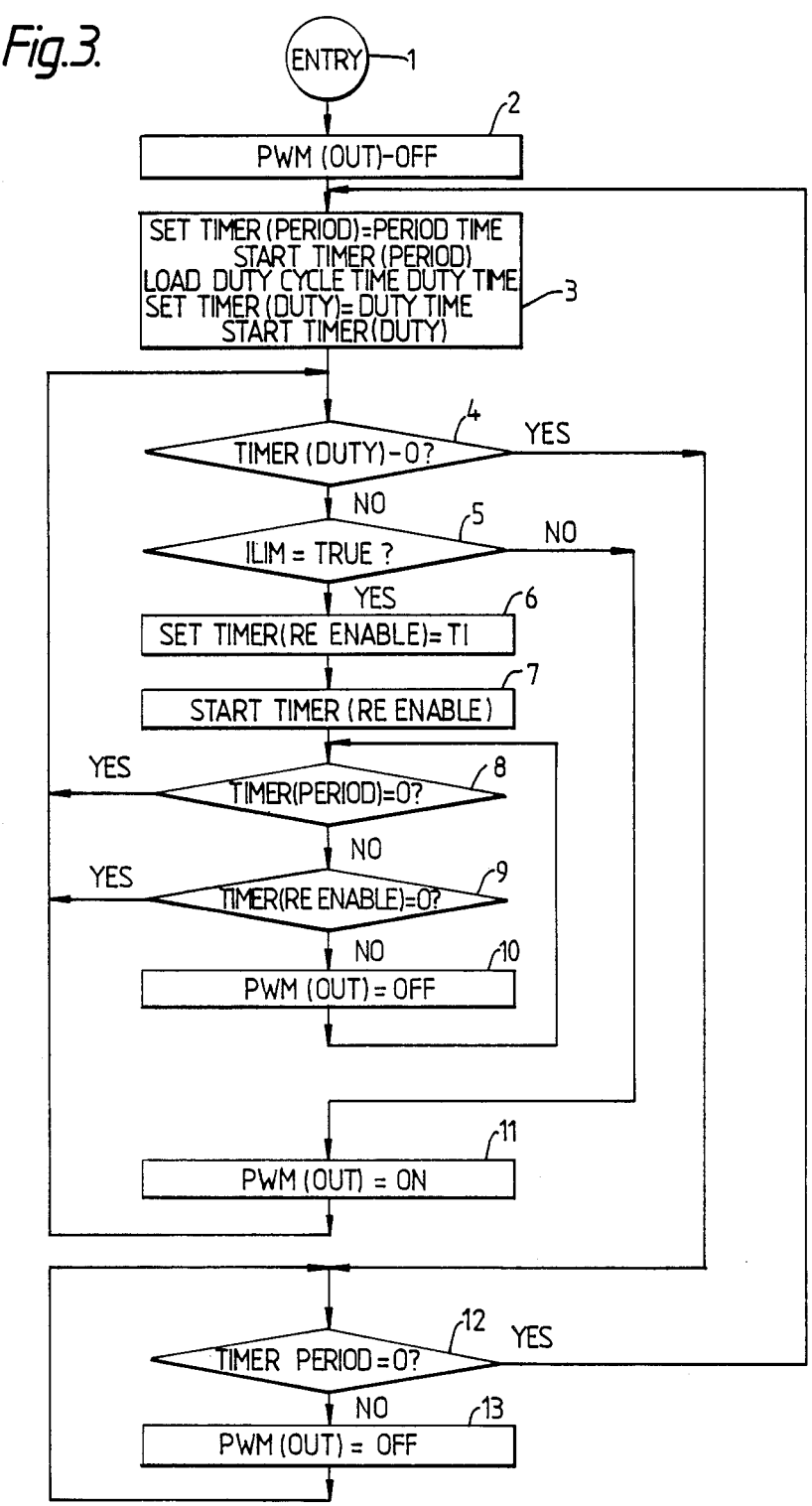
FIG. 3 is a flow diagram illustrating the method of operation of the P.W.M. control for the power switches of FIGS. 1 and 2.

Consider now the method depicted in FIG. 3. The method involves the use of at least one power switch, such as the transistor 12, which provides low and high impedance paths between an inductive load, such as motor winding 14, and a source of power, such as the V supply. The transistor thereby controls the current flow through the inductive load during a sequence of regular reoccurring time periods such as those depicted along the lower axis of FIG. 4. The transistor is switched, if in an "off" state, to an "on" state substantially at the beginning of at least some of the time periods to thereby provide the low impedance path. The method includes the combination of steps, operative during any one of a plurality of the time periods, for sensing a predetermined level of current flow through one of the motor winding and the transistor during its "on" state. In this regard, the P.W.M. control 10 determines when the current flowing through the sense resistor 20 exceeds the predetermined level (i.e., current limit, ILIM).

The transistor is then switched from the "on" state to the "off" state when the predetermined level of current flow has been sensed, causing the current flowing through the motor winding 14 to decay around the loop including the free wheel diode 36.

The power switch is then switched back to the "on" state after the "off" state, independent of the occurrence of the beginning of a time period. Preferably, as disclosed, the method depicted in FIG. 3 causes the transistor 12 to be switched back "on" after a delay period has elapsed following the "off" state.

Consider now the details of the method depicted in FIG. 3 in more detail. The method is preferably implemented in a P.W.M. control in a combination of a program controlled microprocessor and hardware as will be discussed in more detail. The entry is made to the flow through blocks 1 and 2 and, at block 2, symbol P.W.M. (OUT)=OFF indicates that the switch 12 is turned to "off". The P.W.M. control 10 includes TIMER (PERIOD) which determines the P.W.M. period and a TIMER (DUTY) which determines the duty cycle, i.e., the "on" and "off" duty periods during each P.W.M. period. During block 3, the value PERIOD TIME is loaded into the TIMER (PERIOD) and the value DUTY TIME is loaded into the register DUTY CYCLE TIME. Subsequently, the value DUTY TIME is loaded into the TIMER (DUTY) and both timers start a count-down. Count-down of all counters is at the same rate and in synchronism with the clock pulses from clock 30 (FIG. 1).

Operation passes down through to blocks 4 and 5 to block 11, assuming that the TIMER (DUTY) is not initially zero, and that the current limit has not been sensed (i.e., current limit ILIM is not true). Accordingly, block 11 will be entered where P.W.M. (OUT)=ON indicates that the P.W.M. control switches transistor 12 "on", providing a low impedance condition. This then switches transistor 12 "on" at the beginning of a P.W.M. period.

Control continues to pass through blocks 4, 5 and 11, maintaining the transistor 12 "on" until a current limit ILIM is sensed in the sense resistor 20, at which time operation passes from block 5 to block 6 where a reenable time value T1 is loaded into TIMER (RE ENABLE) and block 7, where the TIMER (RE ENABLE) is starting its count-down. Operation then passes through blocks 8 and 9, since neither of the timers indicated there have reached zero, and at block 10, the P.W.M. control again switches the transistor 12 to an "off" state. Operation continues around blocks 8, 9 and 10 until one of the timers reaches zero. Assume that the TIMER (RE ENABLE) reaches zero. This occurs when the delay time value loaded in TIMER (RE ENABLE) has been counted to zero, and causes a branch out of block 9 back to blocks 4 and 5 and back to block 11 where the P.W.M. control again switches transistor 12 to an "on" state. Since the TIMER (PERIOD) has not reached zero, setting of the switch 12 to an "on" state occurred within one P.W.M. period. Also since the TIMER (DUTY) has not reached zero, this also occurred within the "on" duty period of the P.W.M. period.

Assume that transistor 12 is "on", as a result of a time-out of TIMER (RE ENABLE). Also assume another current limit ILIM is sensed. The operation again goes through blocks 6–10, setting the transistor 12 "off".

If, on the other hand, the TIMER (DUTY) had reached zero, then during block 4, blocks 12 and 13 would have been entered where, assuming the TIMER (PERIOD) has not reached zero, the P.W.M. control would have set the transistor 12 "off" even though the current limit ILIM had not yet been reached.

Note that the method depicted in FIG. 3 contemplates the situation where the DUTY TIME stored in TIMER (DUTY) can range from zero up to the value of the PERIOD TIME. In a situation where the value DUTY TIME is equal to the value PERIOD TIME, the "on" period of the duty cycle is equal to the P.W.M. period. Under these circumstances the operation will initially pass from block 4 to block 5 and then on to block 11 where the transistor 12 is set "on", providing full output current. Assuming that the current limit ILIM does not become true, the transistor will be maintained "on" throughout the entire P.W.M. period. The timers TIMER (DUTY) and TIMER (PERIOD) will then reach zero at the same time, the operation will branch from block 4 to block 12, then back to block 3 where the timers are reloaded and restarted, and then blocks 4, 5 and 11 will be reentered. As a result, transistor 12 will be maintained "on" from one P.W.M. period to the next without turn "off". This is the condition depicted in FIG. 4, where in effect there is a 100% DUTY TIME for the transistor switch. A 100% duty cycle is used where desired to provide full power and full current to the winding of the D.C. motor to bring it up to speed.

Another condition may exist. Specifically, it may be desirable not to apply any power to the motor. This is accomplished by loading a DUTY TIME of zero into the TIMER (DUTY). When this occurs, the operation will initially pass directly from block 4 to blocks 12 and 13 where the transistor 12 will be maintained "off" and thus no power is applied to the motor winding.

Figure 5:
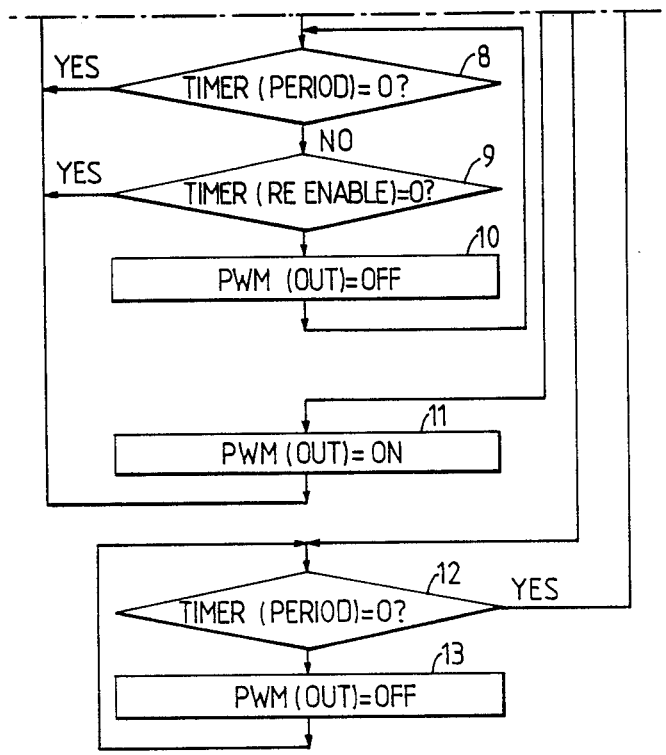
FIG. 5 is a flow diagram illustrating the method of operation of an alternate P.W.M. control for FIGS. 1 and 2 which is speed sensitive and embodying the present invention.

FIG. 5 depicts a preferred method and embodiment of the invention where the step of switching the transistor back to the "on" state within the same time period is inhibited until the motor speed exceeds a predetermined value. Additionally, the delay period between the "off" state and the reenable condition where the transistor is switched back "on" within the same P.W.M. period is delayed, and the delay period is a function of motor speed.

The need for such an arrangement will be understood from the following discussion. At low motor speeds, current ramp-up is fast and current decay is slow, and therefore current ripple in the motor winding is low. As a result, it is not necessary to reenable or re-turn "on" the transistor within the same P.W.M. period and this may even be unacceptable in that it may contribute to current ramping. At medium motor speeds, it is desirable to reenable where the transistor is switched back "on" after an "off" state within the same P.W.M. period so as to increase the average current to the motor winding without current ramping. At high motor speed, the time for the reenable time can be decreased to further reduce current ripple.

Combining these features provides reenable control that is a function of motor speed or velocity, has the advantage that current ramping does not occur, and minimize the amount of switching of the transistor. In summary, the transistor is switched "on" and then switched "off" when a current limit through either the transistor or the motor winding is reached and the transistor is reenabled "on" after a time delay which varies as a function of motor speed. The turn "off" at current limit can be repeated several times and may all occur within a single P.W.M. Additionally, the reenable function is inhibited until motor speed reaches a minimum level.

FIG. 5 illustrates the method implemented in the P.W.M. control 10 of FIG. 1 for providing the reenable inhibit at low motor speeds and for providing the variable time delay for reenable as a function of motor speed. FIG. 5 has blocks numbered the same as FIG. 3. Blocks bearing the same numbers in FIG. 5 perform essentially the same function as the corresponding blocks of FIG. 3.

In addition, FIG. 5 has additional blocks numbered 14, 15, 16 and 17 connected to the output of block 3 and blocks 18 and 19 sequentially connect between the output of blocks 6 and 7.

Inhibiting of the reenable operation at low motor speeds is performed by making a test at block 14 to determine if motor speed is below a low motor speed value A. If it is, then the reenable function is inhibited by passing through to blocks 15, 16 and 17. During block 15, the TIMER (DUTY) is checked to see if it is zero, i.e., whether the end of the duty period has been reached. During block 16, a test is made to see whether the current limit ILIM has been reached. If either test is met, a branch is taken out of the corresponding block back to block 12 where, as discussed above, if the TIMER (PERIOD) is not at zero, block 13 is entered where the transistor is set "off". Assuming neither test is true in blocks 15 and 16, block 17 is entered where the transistor is switched "on" and the operation recycles back to the beginning of block 15. This operation will repeat, causing the transistor switch to remain "on" until the TIMER (DUTY) is zero, causing a branch from block 15, or if current limit ILIM is true, causing a branch from block 16 to blocks 12 and 13 where operation is as described above.

Assuming that the motor speed is above the low value A, operation branches from block 14 to blocks 4, 5 and 6 which are, in operation, the same blocks described with reference to FIG. 3. Following block 6, block 18 is entered where another motor speed check determines if motor speed is below the higher motor speed value of B. If the actual motor speed is less than B, the delay time stored in TIMER (RE ENABLE) is the delay period to be used, and accordingly a branch is taken around block 19 to block 7 where, as discussed with respect to FIG. 3, the TIMER (RE ENABLE) count-down starts.

If during block 18 it is found that the actual motor speed is larger than the higher speed value B, then block 19 is entered where the lower delay time T2 is loaded into the TIMER (RE ENABLE) and then in block 7 where TIMER (RE ENABLE) has started its countdown. Thus it will be seen that the delay period for reenable is larger when motor speed is low and lower when motor speed is higher. Theoretically, the delay time for reenable can be changed many additional times in accordance with changing motor speed. However, for most systems, only two or three reenable time changes are required to maintain an acceptable value of current ripple over the motor speed range.

Figure 9:
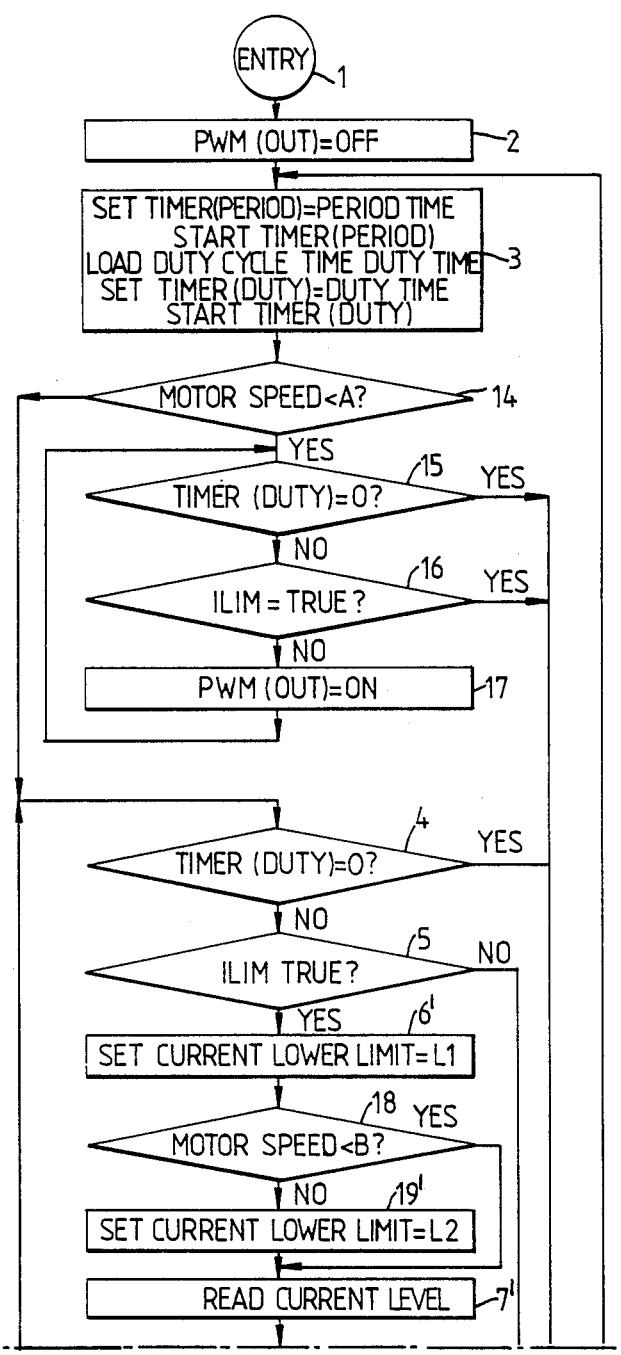
FIG. 9 is a flow diagram illustrating the sequence of operation of the system depicted in FIG. 8 and embodying the present invention.
Figure 9:
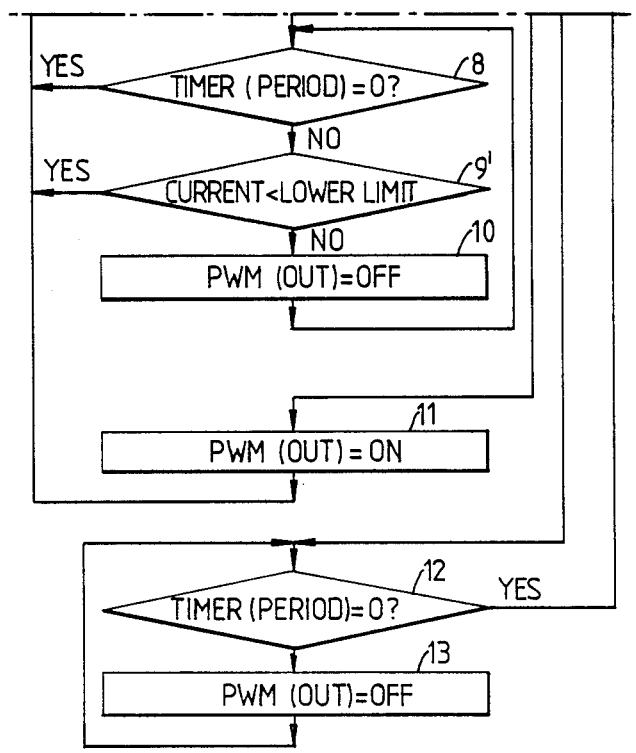
Figure 10:
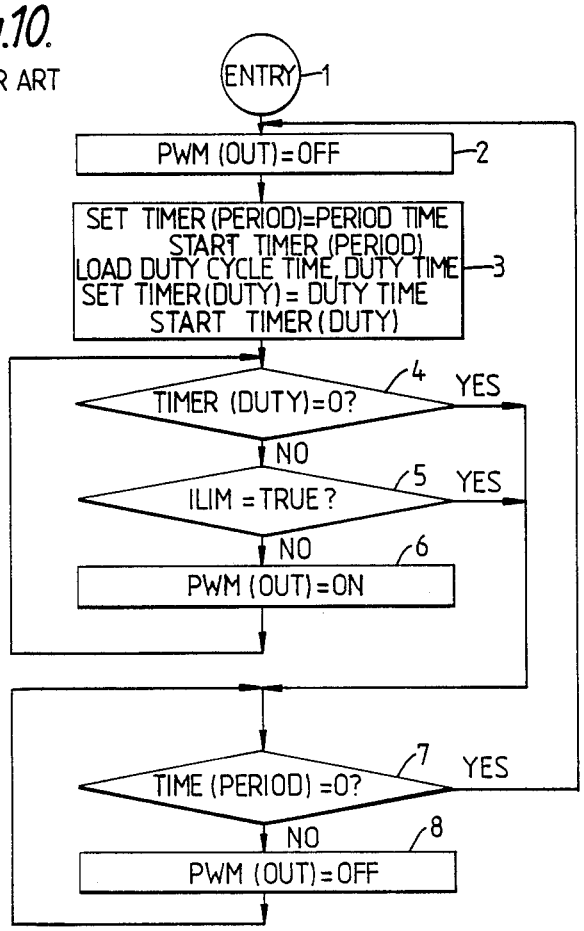
FIG. 10 is a flow diagram illustrating the method of operation of a prior art P.W.M. control for D.C. motors.
Figure 11:
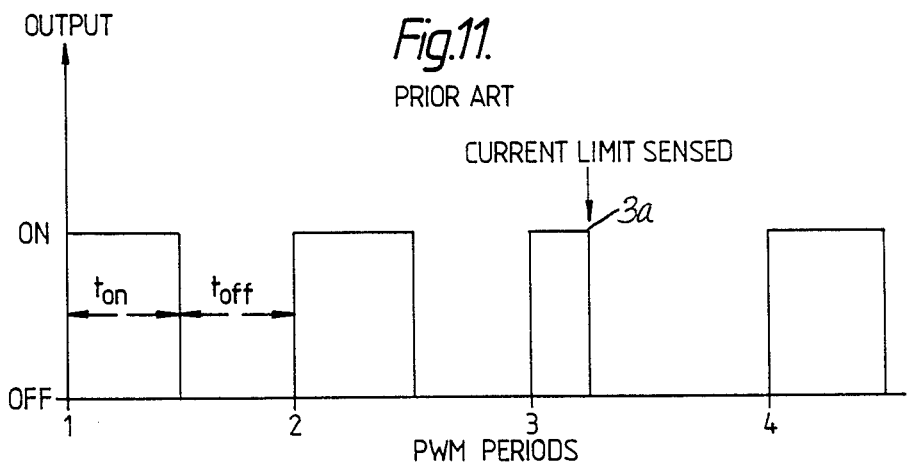
FIG. 11 is a waveshape diagram illustrating the output of a prior art P.W.M. control.

FIG. 9 is a flow diagram illustrating an alternate method for the P.W.M. control 10, where instead of using a delay to determine the time for reenabling the "on" state of the transistor, the means for reenabling is based on continuous monitoring of the current flowing in the motor winding. In operation, when a current limit ILIM occurs and the transistor is switched "off" after an "on" state in the same P.W.M. period, the current in the motor winding begins to fall. By monitoring the level of the current in the motor winding, the transistor can be reenabled "on" after current passes through some lower selected value of current. When the selected value of current is sensed in the motor winding, the transistor is reenabled "on". As a result, the operational conditions that require maximum motor current to be confined between an upper and a lower threshold, and that current ripple is to be confined, may be achieved. One advantage of this method is that more consistent current ripple control may be achieved. However, the disadvantage is that it is difficult and costly to continuously monitor current in the motor winding because of the signal conditions across the winding.

Referring to FIG. 9, the sensing of a selected value of motor winding current is achieved by replacing blocks 6, 7, 9, and 19 of FIG. 5 with, respectively, blocks 6', 7', 9', and 19'. The remaining blocks of FIG. 9 are essentially the same in operation as those depicted in FIG. 5.

During block 6' which follows block 5 (as described above), a LOWER LIMITS register is set or loaded with a selected current value L1. L1 represents a low current limit value. If the actual motor speed is below the higher value B, then block 7' is entered where the actual current level in the motor winding is read. Subsequently, during block 9', the selected current value in LOWER LIMITS register is compared with the actual motor winding current read during block 7'. If the actual current is higher, then block 10 is entered where the transistor is maintained "off". Blocks 7', 8, 9' and 10 are reentered, maintaining the transistor "off" until either the TIMER (PERIOD) reaches zero (i.e., the duty cycle times out) or the actual current read during block 7' is less than the value in LOWER LIMITS register. When either of these conditions occurs, the operation branches back from blocks 8 or 9' to block 4.

Assuming that the duty cycle is not over, operation passes through block 4 to block 5 and if a current limit has not been reached, operation passes on to block 11 where the transistor is turned "on". If during block 18 the actual motor speed is found to be higher than the higher value B, then block 19' is entered, before blocks 7', 8, 9' and 10, where the high current limit value L2 is loaded in the CURRENT LOWER LIMIT register for comparison during block 9'.

FIG. 6B is a schematic and block diagram of the portion of the P.W.M. control for use with microprocessor 10B for implementing the variable speed control method depicted in FIG. 5. FIG. 6B has inputs 40, 42, 43, 44 and 46 which, preferably, are inputs from the microprocessor 10B and other parts of the P.W.M. control 10. The basic P.W.M. operation is provided by TIMER (DUTY) 48, preferably a programmable monostable multivibrator. Its time-out period is controlled by the value DUTY TIME applied on line 46 by the microprocessor. To initiate the operation, the microprocessor provides a CYCLE START pulse on line 44. The leading edge of the CYCLE START pulse, as indicated in FIG. 6B, triggers the time-out operation of the TIMER (DUTY). It will now be seen that the overall frequency of the P.W.M. periods is determined by the repetition rate of the CYCLE START pulses on line 44, which in turn are synchronized with the regular occurring clock pulses. The "on" period of the duty cycle is determined by the time-out period of TIMER (DUTY) 48.

A "D" type output latch 50 allows the current limit and reenable controls to be implemented. The output 51 of the output latch 50 corresponds to the P.W.M. (OUT) in the flow diagram of FIG. 5. Thus when the signal at output 51 is true, transistor 12 is switched "on", whereas when the signal at line 51 is false, transistor 12 is "off". The output latch 50 is connected to the input line 44 on which the CYCLE START pulses are applied. The trailing edge of the CYCLE START pulse causes any clear signals to the output latch 50 from TIMER (DUTY) 48 to be removed. A zero delay comparator 52 compares the DUTY TIME on line 46, and when the DUTY TIME is zero, applies a signal at the input of output latch 50, causing the output latch 50 to maintain a false signal at the output 51. This is required where the duty period is zero and therefore the transistor is not to be turned "on" throughout the P.W.M. period. OR gate 53 is connected to the clear input of the output latch 50. OR gate 53 has an input connected to the line 40 on which the microprocessor applies an ILIM control signal when the current limit is reached. OR gate 53 also has an input connected to the output of TIMER (DUTY). As a result, the OR gate 53 clears the output latch to a condition providing a false output at the end of the time delay of TIMER (DUTY) 48, or when a signal ILIM appears on line 40.

The TIMER (RE ENABLE) 54 together with AND gate 56 controls the reenable operation. More specifically, if the reenable operation is to take place, a true signal is formed on the on/off line 43 by the microprocessor for AND gate 56. As long as the P.W.M. period has not ended by time-out of the TIMER (DUTY), it too provides a true signal to the input of AND gate 56.

Assume now that a current limit has been sensed in the current flowing through transistor 12 of FIG. 1. The microprocessor will apply a true signal ILIM on line 40 and will apply a reenable time value on line 42 to select the time-out period for TIMER (RE ENABLE) 54. The ILIM signal also is applied through OR gate 53 to clear or reset the output latch 50 to a state causing a false output at the P.W.M. (OUT) 51. As a result the transistor 12 is reset "off". When the TIMER (RE ENABLE) 54 times out, a true signal is applied to the remaining input of AND gate 56 causing a true signal to the set input of the OUTPUT LATCH 50 which in turn causes the output P.W.M. (OUT) 51 to become true and thereby switch the transistor 12 "on". Note that the duty cycle is determined by TIMER (DUTY). The true output from TIMER (DUTY) or the ILIM signal will cause OR gate 53 to clear or reset the OUTPUT LATCH 50 so as to provide a false output at 51 and thereby switch the transistor back "off".

Figure 6A:
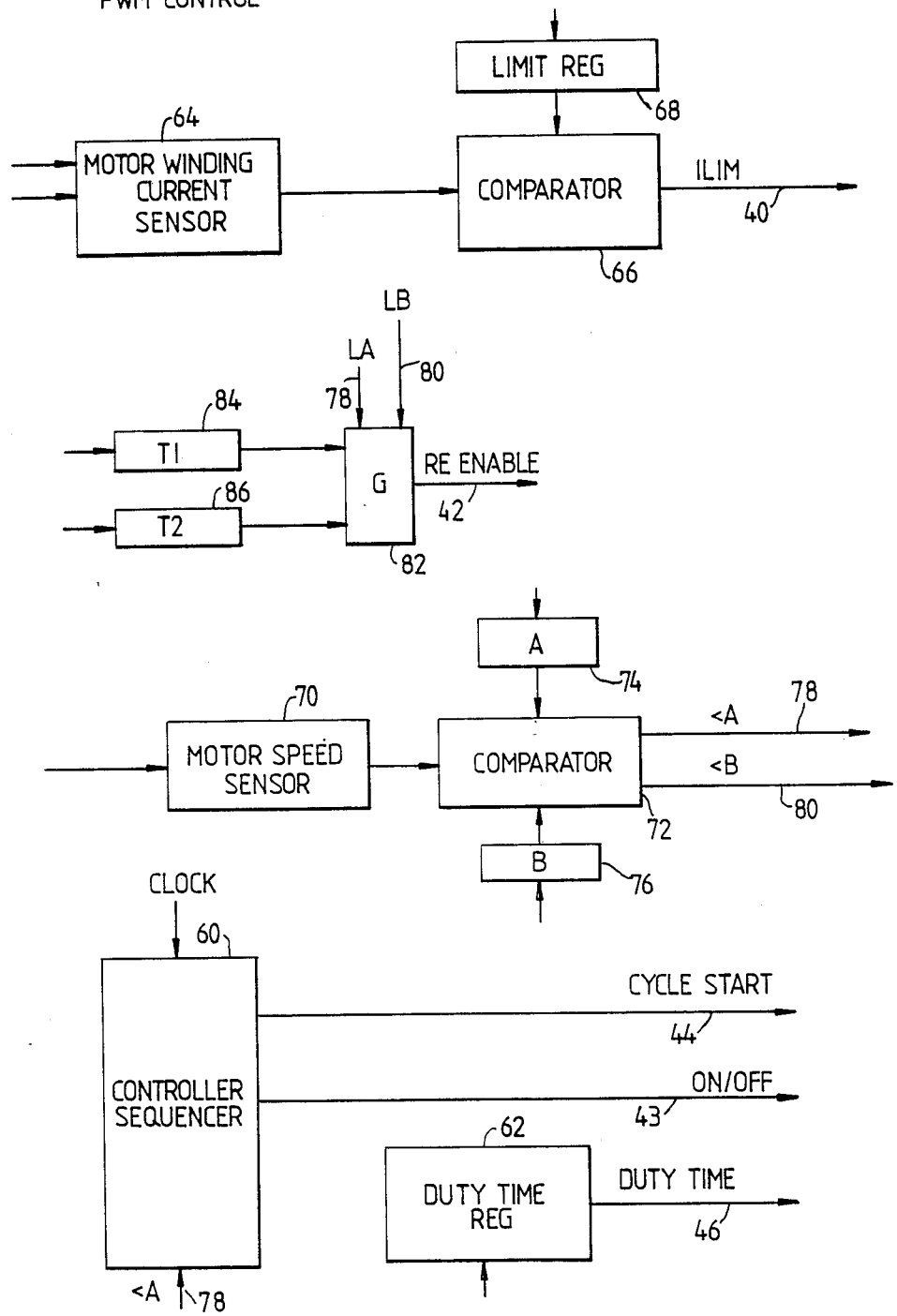

The control signals as indicated above may be applied directly by a microprocessor such as microprocessor 10B in the P.W.M. control 10, or a special purpose timing control unit may be employed. FIG. 6A depicts a special purpose timing control unit for applying the control signals to the input lines 40, 42, 43, 44 and 46 of FIG. 6B. A controller and sequencer 60 sequenced by a clock signal provides a basic timing and control. Control and sequencer 60 applies a control signal on the CYCLE START line 44 to initiate the operation of the P.W.M. control circuit shown in FIG. 6B. If a reenable after current limit is to be performed, then a true signal is applied on the on/off line 43. Additionally, a value, indicative of the duty cycle "on" time, is loaded into a DUTY TIME register 62, and is provided on line 46 to the circuits of FIG. 6B.

Motor winding current sensor 64 senses the magnitude of the current through the current sense resistor 20 of FIG. 1 and applies a signal representing the magnitude comparator 66. A current limit value is stored in limit register 68 and corresponds to the desired limit of current flowing through sense resistor 20 before turn "off" is required. The comparator 66 compares the actual motor current value from sensor 64 with the value in register 68 and provides a control signal ILIM at line 40 when the actual motor current is equal to the limit value in register 68.

A motor speed sensor 70 senses actual motor speed or velocity and provides a value to a comparator 72 corresponding to the actual speed. The motor speed sensor may be constructed in any one of a number of ways well known in the art. For example, it may be a tachometer and, since motor speed is proportional to motor winding voltage, preferably the motor speed sensor is a combination of a microprocessor and voltage sensing circuitry which uses winding voltage to determine motor speed. The comparator 72 has inputs connected to the outputs of registers 74 and 76 which store motor speed values. The motor speed values A and B, discussed in connection with FIG. 5, are stored in registers 74 and 76, respectfully. Comparator 72 compares the actual motor speed from sensor 70 with the values in registers 74 and 76 and forms a true signal at the output 78 whenever the actual motor speed is less than the value in register 74, and a false signal when it is greater. Comparator 72 also compares the actual motor speed from sensor 70 with the value in the B register 76, forming a control signal at output 80 when the actual motor speed is lesser and a false signal when it is larger. Gate 82 is connected to T1 register 84 and T2 register 86. Reenable time values are stored in registers 84 and 86 corresponding to T1 and T2 values described in connection with FIG. 3. When actual motor speed is not less than the value in A register 74, but is less than the value in register B, a false signal is formed at output 78 and a true signal is formed at output 80, causing gate 82 to couple the value in T1 register 84 through to the reenable line 42. If the actual motor speed value is less than the value in both the A and B registers 74 and 76, then false signals are formed at both outputs 78 and 80, and will cause gate 82 to couple the value in T2 register 86 through to the reenable line 42.

The control in sequencer 60 has an input from line 78, and when the signal on line 78 is true, indicating that motor speed is less than the value in A register, it forms a false signal at the output 43, disabling the reenable operation in the P.W.M. control circuitry of FIG. 6B.

Figure 7:
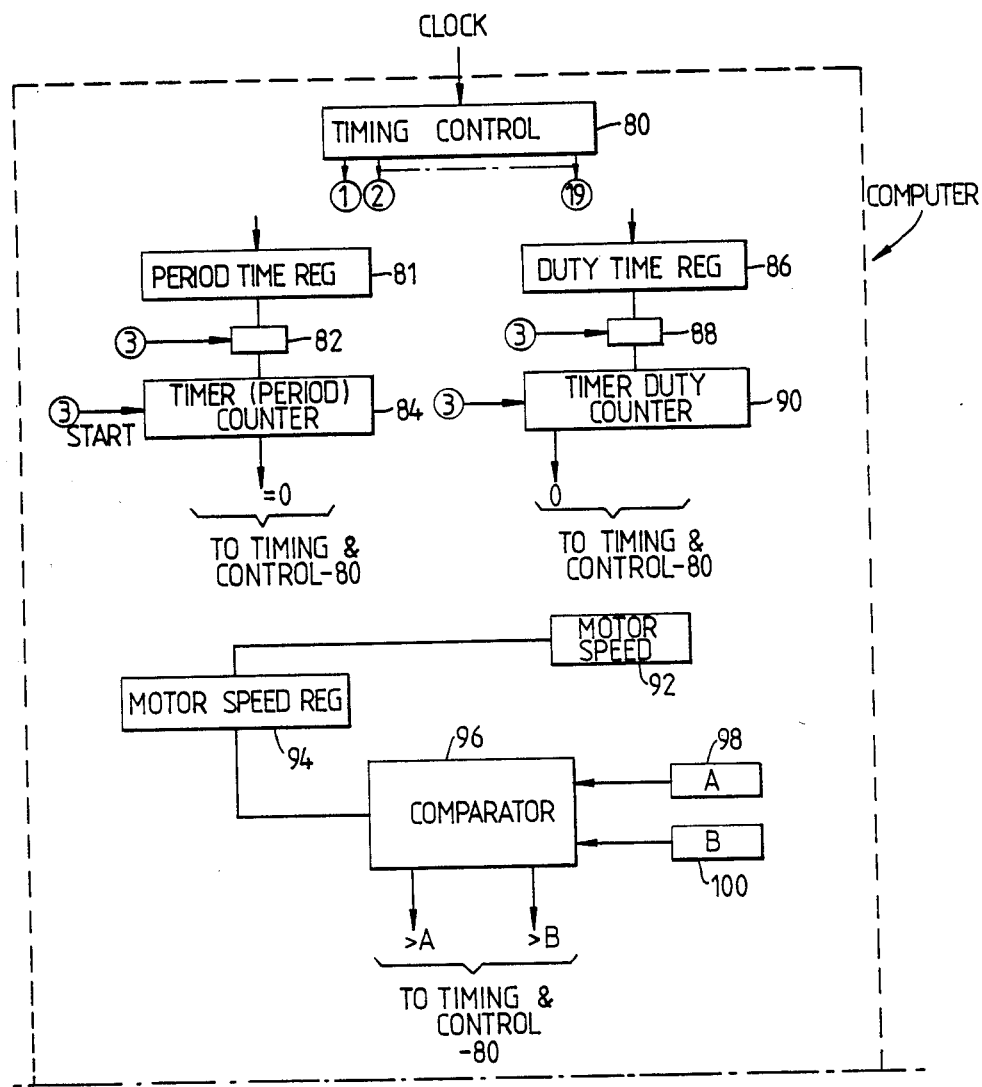
FIG. 7 is a block diagram of an alternate P.W.M. control for use in the block diagram of FIGS. 1 and 2 and embodying the method depicted in FIG. 5.
Figure 7:
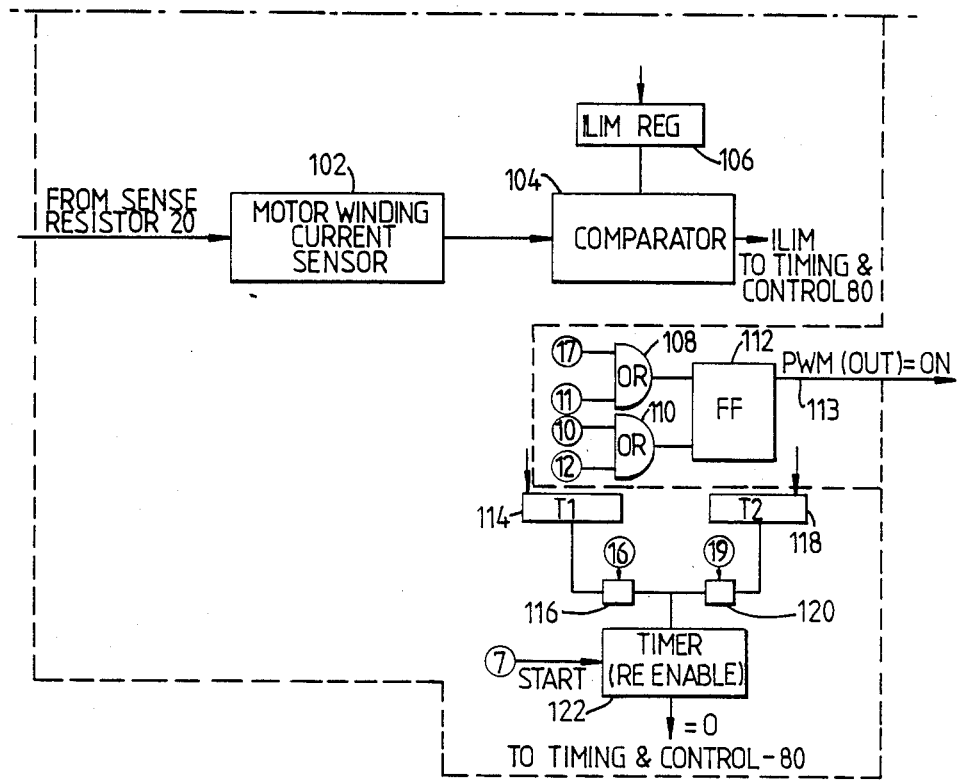

FIG. 7 depicts an alternate P.W.M. control unit which may be implemented as a special purpose microprocessor or a general purpose processor program in accordance with the flow diagram of FIG. 5. A timing control unit 80 synchronized by clock signals forms control signals at the outputs 1-19 indicated within circles. All counters count down at the same rate in synchronism with the clock signals. The outputs of the timing control unit 80 are used as controls for various other portions of FIG. 7 and, as indicated by the corresponding numbers within circles, the numbers within circles also correspond to the flow blocks of FIG. 5. A time value is stored in the PERIOD TIME register 81 and is transferred at time 3 to the TIMER (PERIOD) counter 84. Time 3 initiates the count-down of counter 84 and when it is at zero a true signal is formed at its output which in turn is connected back to the timing and control unit 80 for sequencing its operation. A value is stored in the DUTY TIME register 86 corresponding to the load duty cycle time. Also during time 8, gate 88 gates the content of register 86 into TIMER (DUTY) counter 90 whose count-down is initiated. The output of counter 90 which receives a true signal when in a zero state is connected back to the timing and control 80. A motor speed sensing circuit 92 senses motor speed and provides a representative value to the MOTOR SPEED register 94 corresponding to motor speed. Comparator 96 compares the actual motor speed from register 94 with the A and B values in registers 98 and 100 and provides control signals at the indicated outputs indicating whether the motor speed value is above or below the value in the two registers.

Motor winding current sensor 102 provides an output signal indicating the value of the current in resistor 20. Comparator 104 compares the actual motor current with the current limit value ILIM in register 106 and forms a control signal at the output ILIM when the actual motor current is the larger. TIMER (RE ENABLE) counter 122 is loaded from both of registers 114 and 118 through gates 116 and 120, respectively. The control signal at time 16 causes the T1 value from register 114 to be loaded into the TIMER (RE ENABLE) counter 122, whereas at time 19, gate 120 loads the motor speed value T2 from register 118 into TIMER (RE ENABLE) counter 122. Counter 122, at time 7, starts its count-down operation. When the counter 122 is at zero, a true signal is formed at its output to control the timing and control unit 80.

Flip flop 112 has its output 113 connected to the base or input of transistor 12. When flip flop 112 is in a true state, the transistor is "on". When flip flop 112 is in a false state, the transistor is "off". Flip flop 112 is set to a true state by OR gate 108 during times 11 or 7. Flip flop 112 is reset to a zero state by OR gate 110 during times 10 or 12. The sequence of operation of FIG. 7 is thus depicted by the flow diagram of FIG. 5.

Figure 2A:
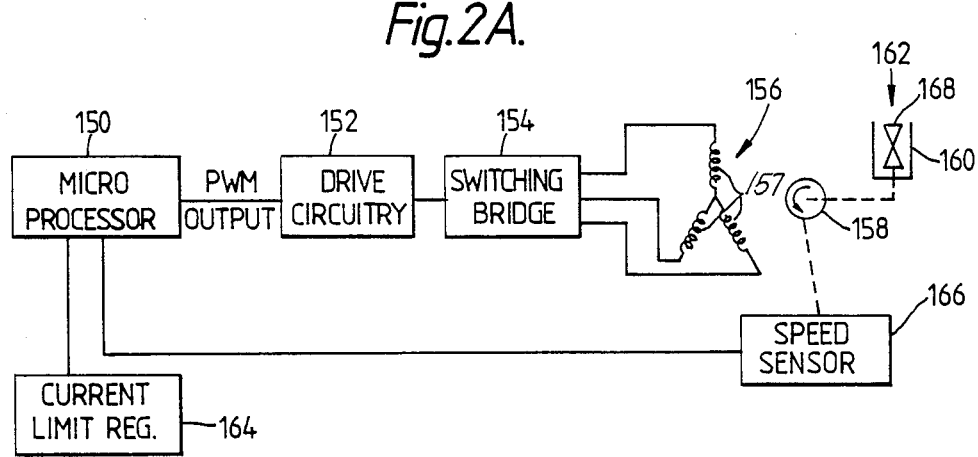
FIG. 2A is a schematic and block diagram of a laundry machine having an electronically commutated motor and motor control similar to that depicted in FIG. 2.
Figure 2:
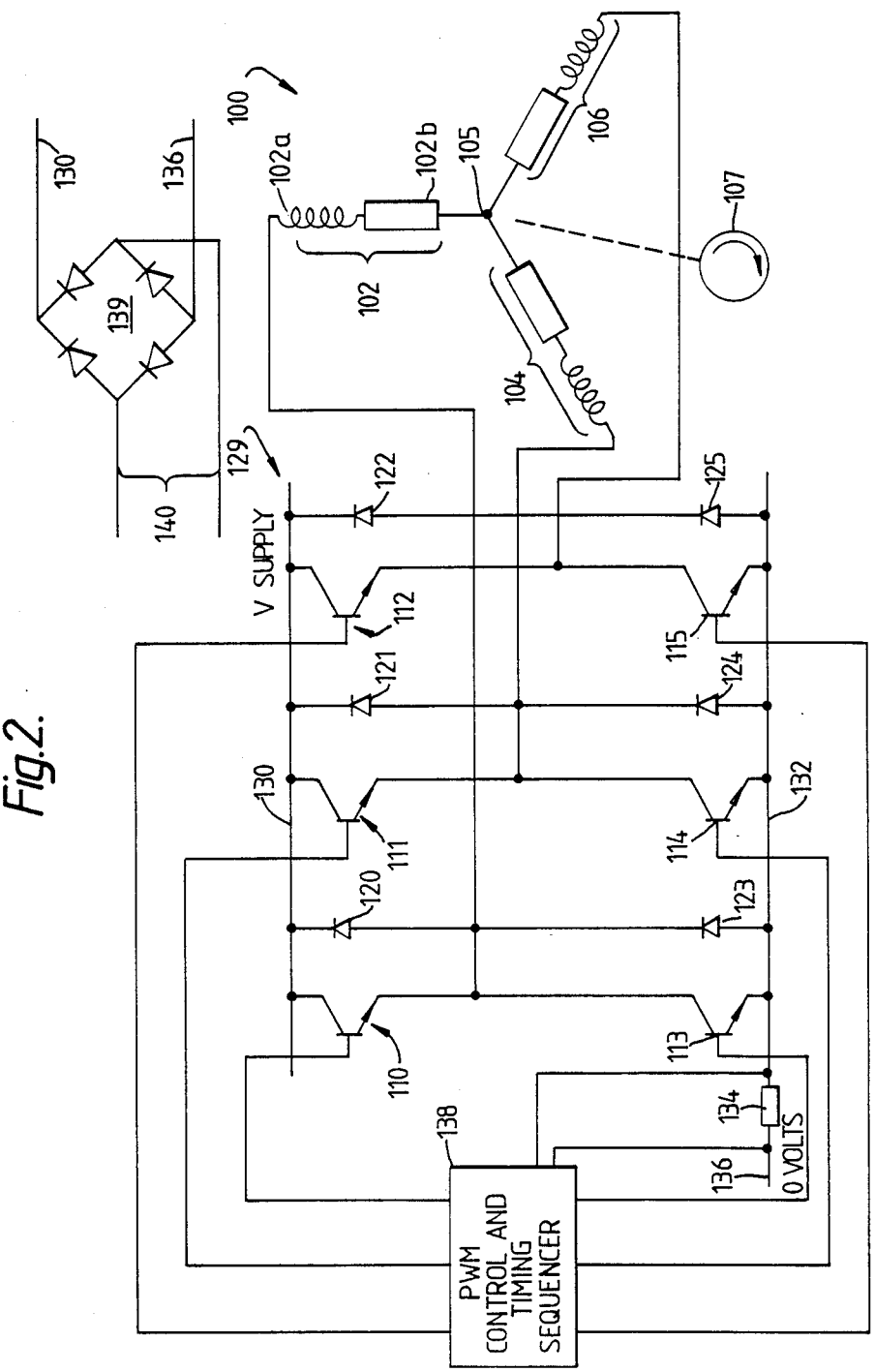
FIG. 2 is a schematic and block diagram of a P.W.M. control and timing sequencer for controlling a plurality of power switches which in turn apply and remove power across the multiple windings of a D.C. motor, the system forming an electronic commutated motor drive system and embodying the present invention.

FIG. 2 depicts an alternate embodiment of the invention in which a P.W.M. control and timing sequencer 136 is controlling an electronically commutated motor (E.C.M.) system. The motor is depicted at 100 and is a brushless type motor with windings 102, 104 and 106 and a rotor 107. Each winding is schematically depicted by an inductor and a resistor such as 102a and 102b for winding 102. One side of the windings is connected together to a common junction 105.

The opposite end of each of the windings from the common junction 105 is connected to a totem pole type switching circuit indicated generally at 129. The totem pole switching circuit 129 includes a pair of transistors serially connected together at a junction emitter with the junction connected to the opposite ends of the windings of the motor 100 from common connection 105 of the windings. Thus, transistor pairs 110,113, 111,114, and 112,115 are connected, respectively, to the motor windings 102, 104 and 106, with the emitter junction of transistors 110, 111 and 112 connected to the collector electrodes, respectively, of transistors 113, 114 and 115.

Free wheel diodes are connected across the collector and emitter electrodes of each of the transistors so as to protect the transistors in a conventional manner known in the art. The anode and cathode electrodes of the diodes 120, 122, 123, 124 and 125 are connected, respectively, to the collector and emitter electrodes of transistors 110, 111, 112, 113, 114 and 115. Each of the transistor pairs 110,113, 111,114, and 112,115, is serially connected between a positive rail 130 of the V supply and a conductor 132. The conductor 132 is serially connected through a current sense resistor 134 to a rail 136, which is the zero volt or negative side of the V supply. The bases of the electrodes of each of the transistors are connected to the P.W.M. control and timing sequencer 138 which provides the sequencing, timing and control for properly sequencing the "on" and "off" states of the transistors.

Current is provided through each of the windings 102, 104 and 106 in sequence and in directions which rotate the rotor 107. Transistors 110, 111 and 112 couple windings to the positive rail 130, and transistors 113, 114 and 115 connect windings to the negative rail 136 through resistor 134. Two transistors, one from the group 110, 111 and 112, and one from the group 113, 114 and 115, are "on" at any one time so as to pass current through the motor windings in a sequence well known in the art. One of the "on" transistors stays on continuously and the other is controlled in accordance with the P.W.M. methods disclosed herein.

Figure 8:
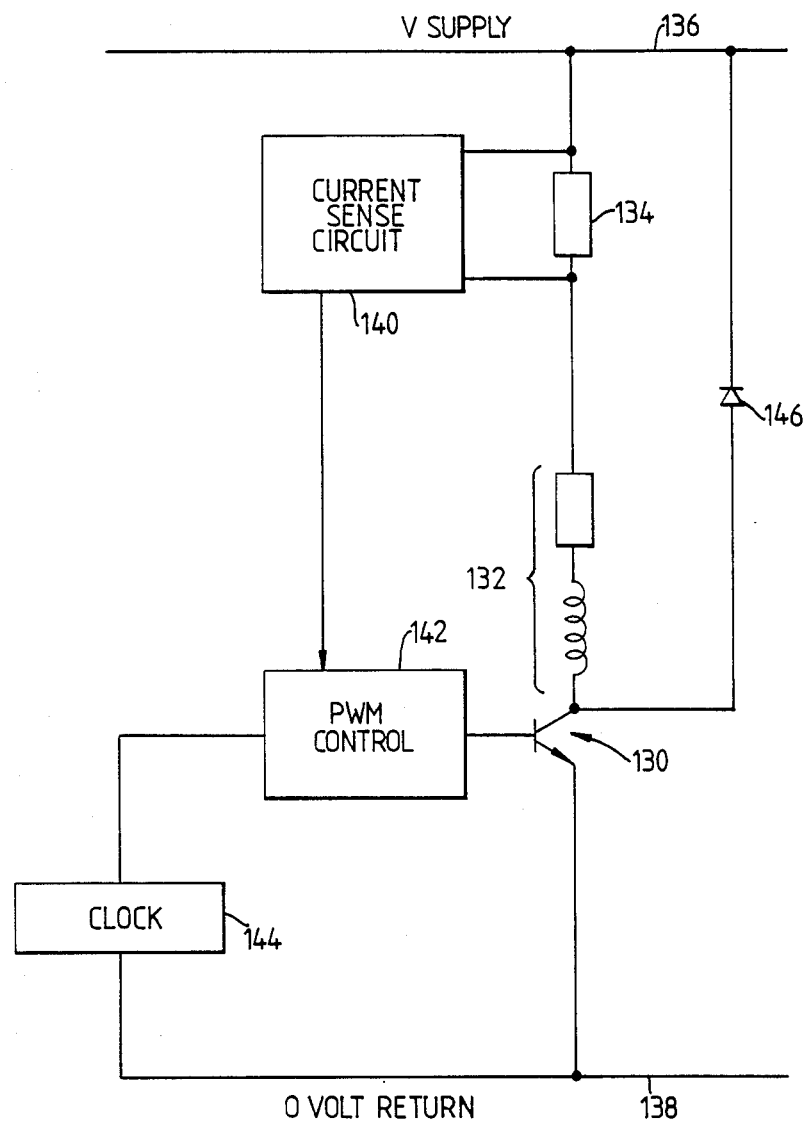
FIG. 8 depicts an alternate embodiment similar to that depicted in FIG. 1 with current sensing in the motor winding and embodying the present invention.

The preferred power supply for each of FIGS. 1, 2 and 8 is an A.C. line driven unfiltered full wave rectifier such as depicted at 139 in FIG. 2. The sine wave from the A.C. line is thus converted to an A.C. full wave rectified signal between rails 130 and 136. As a result, the multiple harmonic feedback into the A.C. lines, which is attendant with filtered power supplies, is avoided. Significantly, an embodiment of the invention using the described method avoids the need for a filtered source of power to achieve the desired motor power.

FIG. 2A is a schematic and block diagram of a preferred embodiment of the invention employing the E.C.M. of FIG. 2 in a laundry machine. Microprocessor 150 applies a sequence of P.W.M. control signals, using methods similar to that disclosed above, to driving circuits 152 which in turn control transistors in a totem pole bridge of the type disclosed in FIG. 2.

Motor windings 157 of a 3-phase D.C. brushless motor 156 cause motor armature 158 to rotate. Armature 158 is directly connected to and reciprocally rotates agitator 160 of a washing machine 162. The agitator in turn rotates spin tub 160. The washing machine is of the type where an E.C.M. motor can be directly connected to the agitator and reciprocally rotates the agitator but when the agitator rotates in one direction it picks up and drives the spin tub at the same speed. Such a washing machine is disclosed in U.S. Pat. No. 3,914,463 filed in the name of Brimer, the subject of which is incorporated herein by reference. Current limit register 164 provides the limit value for motor and/or transistor switch current and actual motor speed is provided by sensor 166 to microprocessor 150 for carrying out the method discussed above.

FIG. 8 depicts an alternate embodiment of the invention which senses current through the motor winding. In the embodiment of FIG. 8, motor winding current is sensed to determine when it has decayed in order to determine the reenable time for switching the transistor back to "on". Additionally, the motor winding current is sensed to determine when the current limit ILIM has been reached. The system of FIG. 8 includes a transistor 130, a motor winding 132 and a current sense resistor 134 serially connected between the positive rail 136 and the negative rail 138 of V supply. A current sense circuit 140 is connected across the sense resistor 134 for determining the level of current flow and has an output connected to the input of P.W.M. control 142. The P.W.M. control 142 has another input connected to a clock 144 and an output connected to the base of transistor 130. A free wheel diode 146 is connected in parallel with the series connected resistor 134 and winding 132.

In operation, the P.W.M. control 142 switches the transistor 130 to an "on" state causing current to flow between rails 136 and 138 from the V supply, flowing through resistor 134, winding 132 and transistor 130. When the output from current sense circuit 140 indicates the current limit ILIM, P.W.M. control 142 switches the transistor 130 "off". The current sense circuit 140 also monitors the decay in current through the sense resistor 134 and, when current has decayed to a selected value, P.W.M. control 142 switches the transistor 130 back "on". Again, the initial turn "on" of transistor 130 is commenced at the beginning of a P.W.M. cycle, and the turn "off" and reenable to turn back "on", are all performed within a single P.W.M. cycle using a method according to the present invention illustrated in FIG. 9.

Although this invention has been described with an inductive load in the form of a motor winding, it is to be understood that in the broader concepts of the invention, the inductive load may be a power supply or other inductive load where a P.W.M. control is desired.

It will also be appreciated that the V supply may be a rippling rail type of power supply without deleterious effects because of the characteristics of the method and means according to this invention.

Examples of values in a practical embodiment of this invention are:
PERIOD TIME = 100 microseconds
DUTY TIME = 0-100 microseconds
RE ENABLE time T1 = 30 microseconds
RE ENABLE time T2 = 21 microseconds
Speed A = 4,480 RPM
Speed B = 6,560 RPM It will be understood that other types of switches may be used in place of the transistor such as a gate turn-on thyristor, it being a prime desire to minimize costs of the switches because of the large number involved in a bridge of the type shown in FIG. 2.

Although an exemplary embodiment of the invention has been disclosed for purposes of illustration, it will be understood that various changes, modifications and substitutions may be incorporated into such embodiment without departing from the spirit of the invention as defined by the claims appearing hereinafter.

What is claimed:

1. A pulse width modulated method, using at least one power switch having "on" and "off" states for providing, respectively, low and high impedance paths between an inductive load and a source of power, thereby controlling the current flow through the inductive load during a sequence of regular reoccurring time periods, and wherein the at least one power switch is switched to the "on" state during a plurality of the time periods causing a current flow, the method comprising the combination of steps, operative during any one of a plurality of the time periods, of:

switching the at least one power switch from the "on" state to the "off" state when a predetermined level of current flow has been reached flowing in one of, the inductive load and the at least one power switch; and switching the at least one power switch back to the "on" state after the "off" state in the same time period as the "off" state occurred, independent of the occurrence of the beginning of a time period and, if the off state exists at the end of the time period, then at the beginning of the next time period.

2. The method of claim 1 comprising the step of sensing when a predetermined maximum level of current flow through one of, the inductive load and the at least one power switch, has been reached during the "on" state of the at least one power switch; and enabling the step of switching the at least one power switch from the "on" state to the "off" state when said predetermined maximum level of current flow has been sensed.

3. The method of claim 1 wherein the inductive load is winding of a motor and comprising the step of applying the recited steps using, as the inductive load, the at least one winding of a motor.

4. The method of claim 3 wherein the inductive load comprises a further winding and at least one still further winding and there is a further power switch and a still further power switch, each having "on" and "off" states for providing, respectively, low and high impedance paths between a source of power and said further winding and said still further winding, and comprising the additional steps of
repeating the steps recited in claim 1 using as said inductive load said further winding and using, as said at least one power switch, said further power switch thereby controlling the current flow through said further winding using said further power switch; and
further repeating the steps recited in claim 1 using as said inductive load said still further winding and using as said at least one power switch said still further power switch thereby controlling the current flow through said still further winding using said still further power switch.

5. The method of claim 1, 3 or 4 comprising the steps of delaying the step of switching the at least one power switch back to the "on" state until a preselected time interval has elapsed after the "off" state thereof.

6. The method of claim 1, 3 or 4 comprising the step of inhibiting said step of switching the at least one power switch back to the "on" state until current in said inductive load has decayed to a selected value.

7. The method of claim 1, 3 or 4 comprising the step of sensing when current flowing in said inductive load decays to a selected value; and inhibiting said step of switching the at least one power switch back to the "on" state until said selected value of current has been sensed.

8. The method of claim 3 or 4 comprising the step of inhibiting said step of switching the at least one power switch back to the "on" state until the motor speed exceeds a predetermined value.

9. The method of claim 3 or 4 comprising the step of delaying said step of switching the at least one power switch back for a delay period after the "off" state; and varying the delay period as a function of motor speed.

10. The method of claim 3 or 4 comprising the steps of inhibiting said step of switching the at least one power switch back to the "on" state until the motor speed exceeds a predetermined value and until a delay period has occurred after the "off" state; and varying the delay period as a function of motor speed.

11. The method of claim 3 or 4 comprising the step of delaying said step of switching the at least one power switch back until a first preselected time interval has elapsed after the "off" state when motor speed is below a preselected value and until a second preselected time interval has elapsed after the "off" state when motor speed is above said preselected value.

12. The method of claims 1, 3 or 4 wherein a plurality of the time periods each have mutually exclusive "on" and "off" duty periods for the at least one power switch with the "on" duty period located at the beginning of a time period, and the method includes the step of switching the at least one power switch, if in the "on" state, to the "off" state substantially at the beginning of the "off" duty period.

13. The method of any claim 1, 3 or 4 comprising the step of using a substantially unfiltered A.C. rectified signal as the source of power during the steps of the method.

14. The method of claim 13 comprising the step of forming a substantially unfiltered full wave rectified A.C. signal and using such signal as the source of power during the steps of the method.

15. The method of claim 3 or 4 wherein the motor comprises either an electronically commutated motor or a D.C. motor.

16. The method of controlling current in a direct current motor using a pulse width modulated speed control system operable during a series of pulse width modulated periods and having at least one power switch, said method including the steps of turning the at least one power switch "on", allowing the power switch to remain "on" for a duty cycle, during each of a plurality of the pulse modulated periods causing current flow;

sensing the current flow during said plurality of pulse width modulated periods;
turning the power switch "off" during each of said plurality of pulse width modulated periods, when the sensed current substantially reaches a maximum current level; and
sensing the speed of the motor and comparing the speed with at least one predetermined speed limit, and upon the predetermined speed limit being reached turning the power switch "on" again, during the same pulse width modulated period of the said plurality of pulse width modulated periods as that in which the power switch was turned "off" as a result of the maximum current level having been reached; switching the power switch, if "off", back "on" when the next pulse width modulated period commences;
the turning "on" and turning "off" times of the power switch being short enough to limit current decay in the motor circuit within predetermined limits but long enough to prevent current ramping, both the switching "off" and switching "on" of the power switch being effected at time intervals such that the resultant current ripple in the motor is maintained low enough so as to maintain the average current flowing in the motor at a level not materially lower than a predetermined allowable current, and repeating the recited steps.

17. A pulse width modulated current controller for an inductive load, the controller comprising at least one power switch having "on" and "off" states for providing, respectively, low and high impedance paths between the inductive load and a source of power, thereby controlling the current flow through the inductive load during a sequence of regular reoccurring time periods, and wherein the at least one power switch is switched to an "on" state during a plurality of time periods causing a current flow, the controller comprising:

means for switching the at least one power switch from the "on" state to the "off" state when a predetermined level of current flow has been sensed flowing in one of, the inductive load and the at least one power switch, during any one of a plurality of the time periods; and
means for switching the at least one power switch back to the "on" state after the "off" state in the same time period as the "off" state occurred, independent of the occurrence of the beginning of the time period and also, if the "off" state exists at the end of the time period, then at the beginning of the next time period.

18. The controller of claim 17 comprising means for sensing when a predetermined maximum level of current flow through one of, the inductive load and the at least one power switch, has been reached during the "on" state of the at least one power switch; and
   means for enabling the means for switching the at least one power switch from the "on" state to the "off" state when said predetermined maximum level of current flow has been sensed.

19. The controller of claim 17 comprising means for coupling the at least one power switch in a series circuit relation with at least one winding of a motor between outputs of the source of power, the at least one winding thereby forming the inductive load.

20. The controller of claim 17 or 19 comprising time delay means for delaying the switching of the at least one power switch back to the "on" state until a preselected time interval has elapsed after the "off" state thereof.

21. The controller of claim 17 or 19 comprising means for inhibiting the switching of the at least one power switch back to the "on" state until current in said inductive load has decayed to a selected value.

22. The controller of claim 17 or 19 comprising means for sensing when a current flowing in said inductive load decays to a selected value, and inhibiting the switching of the at least one power switch back to the "on" state until said selected value of current has been sensed.

23. The controller of claim 19 comprising means for inhibiting the switching of the at least one power switch back until the motor speed exceeds a predetermined value.

24. The controller of claim 19 comprising timing means for delaying the switching of the at least one power state back for a delay period after the "off" state, and means for varying the delay period as a function of motor speed.

25. The controller of claim 19 comprising means for inhibiting the switching of the at least one power switch back until the motor speed exceeds a predetermined value and until a delay period has occurred after the "off" state; and varying the delay period as a function of motor speed.

26. The controller of claim 19 comprising means for delaying the switching of the at least one power switch back until a first preselected time interval has elapsed after the "off" state when motor speed is below a preselected value and until a second preselected time interval has elapsed after the "off" state when motor speed is above said preselected value.

27. The controller of claim 17 or 19 wherein a plurality of time periods each have mutually exclusive "on" and "off" duty periods with the "on" duty period located at the beginning of a time period, the controller including means for switching the at least one power switch, if in the "on" state, to the "off" state substantially at the beginning of the "off" duty period.

28. The controller of claim 17 comprising means for forming a substantially unfiltered A.C. rectified signal as the source of power used by the controller.

29. The controller of claim 17 including a full wave rectifier for forming a substantially unfiltered full wave rectified A.C. signal as the source of power used by the controller.

30. The controller of claim 19 wherein the motor comprises either an electronically commutated motor or a D.C. motor.

31. A controller for controlling current in a direct current motor using a pulse width modulated speed control system having a series of pulse width modulated time periods, the controller comprising:
   at least one power switch;
   means for turning the at least one power switch "on", allowing the power switch to remain "on" for a duty cycle, during each of a plurality of the time periods causing current flow;
   means for sensing the current flow during each of said plurality of time periods;
   means for turning the power switch "off", when "on", when the sensed current flow substantially reaches a maximum current level during each of said plurality of time periods;
   means for sensing the speed of the motor and for comparing the speed with at least one predetermined speed limit to determine when the predetermined speed limit is reached;
   means for turning the power switch "on" again during the same pulse width modulated period of said plurality of pulse width modulated periods as that in which the power switch was turned "off" as a result of the maximum current level having been reached upon the predetermined speed limit being reached during each of said plurality of time periods; and
   means for switching the power switch if "off", back "on" when the next pulse width modulated period commences;
   the turning "on" and turning "off" times of the power switch being short enough to limit current decay in the motor circuit within predetermined limits but long enough to prevent current ramping, both the switching "off" and switching "on" of the power switch being effected at time intervals such that the resultant current ripple in the motor is maintained low enough so as to maintain the average current flowing in the motor at a level not materially lower than a predetermined allowable current.

* * * * *

UNITED STATES PATENT AND TRADEMARK OFFICE
CERTIFICATE OF CORRECTION

PATENT NO.  :   4,841,207
DATED       :   June 20, 1989
INVENTOR(S) :   Neil G. Cheyne It is certified that error appears in the above-identified patent and that said Letters Patent is hereby corrected as shown below:

In the Specification:

Column 6, line 63, change "a" to -- an --.

Column 9, line 40, change "minimize" to -- minimizes --.

Column 13, line 5, change "respectfully". to
            -- respectively --.

In the Claims:

Column 17, line 57, change "claims" to -- claim --.

Column 17, line 65, before "claim" delete "any".

Signed and Sealed this

Eighteenth Day of September, 1990

Attest:

HARRY F. MANBECK, JR.

*Attesting Officer*          *Commissioner of Patents and Trademarks*